Aug. 19, 1952 W. MESSINGER 2,607,641
X-TYPE BEARING
Filed March 2, 1949

INVENTOR.
WILLIAM MESSINGER
BY
his ATTORNEYS

Patented Aug. 19, 1952

2,607,641

UNITED STATES PATENT OFFICE 2,607,641

X-TYPE BEARING

William Messinger, Philadelphia, Pa.

Application March 2, 1949, Serial No. 79,133

2 Claims. (Cl. 308—234)

1

This invention relates to improvements in antifriction bearings and more particularly to improved X-type bearings suitable for use in supporting relatively rotatable elements of heavy duty machinery and the like.

My Patent No. 2,430,359, dated November 4, 1947, discloses a typical X-type bearing in which angularly related rollers are interposed between angularly related race surfaces in such a way as to oppose radial as well as axial thrust. These X-type bearings have proven to be particularly satisfactory for resisting heavy thrust loads; for example, in the journal boxes of railway cars and the like. They are also very satisfactory for supporting a rotatable element against radial as well as axially directed forces. However, due to the fact that there is some looseness present in bearings of this type to keep the friction to a minimum, these bearings have not been entirely satisfactory for use in precision mounted devices which are subjected to heavy loads, for example, the rotary tables of heavy duty boring machines, the turrets of gun mounts and the like. Due to the play permitted by these bearings, chattering or relative movement in addition to rotating movement is permitted so that the desired precision of operation cannot be obtained.

I have discovered that the disadvantages of my patented bearings, when used for supporting heavy loads, arise from certain characteristics inherent in such bearings. Thus, the individual rollers of the bearing operate between substantially conical inner and outer race surfaces, the inner surface being convex while the outer surface is concave. So long as the roller is parallel with a generatrix of each of these surfaces, no difficulty is encountered for the roller maintains substantially line contact with each of the race surfaces. However, some lack of parallelism or canting of the rollers can take place because of the clearances required for free movement of the roller in the cage member of the bearing. Canting movement of the individual rollers relative to the inner convex conical race member does not produce any undesirable effect, for the contacting surface of the roller then becomes tangent to the convex curvature of the inner race member and substantially point contact between the roller and the race surface results. Inasmuch as this point contact is at about the center of the roller and the center of the raceway, there is no tendency for the roller to bind.

The situation is quite different with regard to the contact between the outer concave conical race surface and the roller. Upon canting of

2 the roller, the surface of the roller assumes the position of a chord of the curvature of the race surface so that the forces acting on the roller are concentrated at opposite ends of the roller. Under ordinary load condiions, the forces are insufficient to produce a binding of the rollers, but, if the bearing is to be preloaded in order to eliminate play in it, the end contact of the roller with the race surface may become sufficiently strong to introduce strong frictional restraint to the rotation of the bearing and even jamming and locking of the entire bearing.

An object of the present invention is to provide an X-type bearing which can be preloaded to eliminate play from it without causing the bearing to jam during its operation.

A further object of the invention is to provide a relatively frictionless X-type bearing which is substantially chatterless so that it can be used in heavy duty machinery to provide a precision mount for a rotary element thereof.

Other objects of the invention will become apparent from the following description of typical forms of bearings embodying the present invention.

In accordance with the present invention, I have modified the X bearings of the type disclosed in my Patent No. 2,430,359 by providing a transverse crown of small magnitude on each of the outer race surfaces, this crown or curvature transversely of the race surface being sufficient to prevent concentration of the load exerted on the rollers at their ends. In this way, the slight canting inherent in the rollers can do no more than produce line contact of the roller with the outer race surface so that the stresses are well distributed and there is no tendency to produce further canting of the rollers.

By providing such crowned race surfaces on the outer bearing members, I am also enabled to preload the bearings, thereby eliminating play from them and making them most useful for supporting radial and axial loads even in heavy duty machinery and in precision machinery the operation of which would be seriously affected by play or chatter in the bearing.

I accomplish the preloading of the bearing by providing a split outer race member in the form of two separable rings each having a crowned race surface thereon, these ring members being so designed that when they engage with the rollers of the bearing with light contact, the bearing rings are spaced slightly apart. When these rings are forced together into face-to-face contact, they exert pressure on the rollers or preload the rollers to a degree dependent upon the spacing between the ring elements. Such preloading effectively eliminates any play between the rollers and the race surfaces in right-angularly related directions so that thrust loads and radial loads have no effect on the relation between the inner and outer race members.

An added advantage obtained by means of the separable ring structure referred to above is that these rings may be so designed as to permit them to flex or dish slightly under preloading whereby they will exert resilient pressure on the rollers which will compensate for wear on the bearing surfaces and the rollers.

For a better understanding of the present invention, reference may be had to the accompanying drawings, in which.

Figure 1:
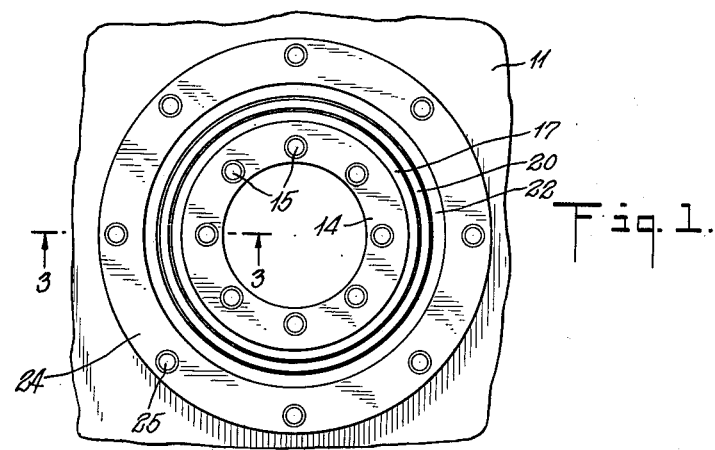
Fig. 1 is an end view of a typical bearing assembly embodying the present invention.
Figure 2:
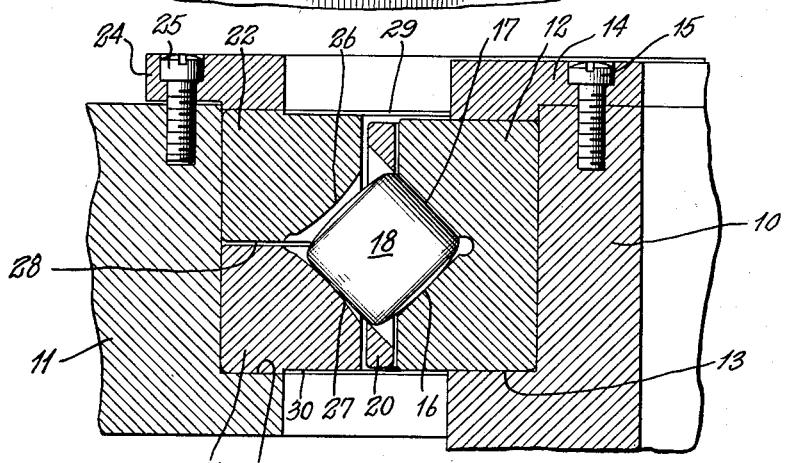
Fig. 2 is a view in section through one side of the bearing illustrating the bearing in its partially assembled condition.

Referring now to Figs. 1 and 2, a typical bearing assembly may be used to support a rotary sleeve or hollow shaft member 10 in a fixed member 11. The bearing assembly may be used in precision gun mounts, heavy duty milling and boring machinery and for any other purpose where relatively frictionless movement under load may be required.

As shown in Fig. 2, the bearing includes an inner race member 12 which may be seated against a shoulder 13 in the shaft member 10 and retained in position by means of a clamping ring 14 which is secured by means of screws 15 or the like. The race member 12 is provided with two angularly related race surfaces 16 and 17, which, as illustrated, may be in right-angular relationship. Rolling against these race surfaces 16 and 17 are sets of right-angularly related rollers 18 and 19 which are supported in a cage member 20 of a type more particularly disclosed and described in my Patent No. 2,430,359.

The outer race member may be made up of two separable rings 21 and 22, one of these rings being mounted against a shoulder 23 on the supporting member 11 while the other is retained in position by means of a clamping ring 24 also secured to the member 11 by means of the screws 25. The rollers 18 and 19 are of a greater diameter than their axial lengths so that clearance is afforded between the ends of the rollers and the surfaces in right-angular relation to the surfaces with which the rollers are in rolling engagement. The length of each roller 18, for example, is less than the spacing between the surface 16 and the race surface 26 on the ring member 22 by an amount at least equal to the elastic deformation of the race members and the rollers under load. Similarly, the length of each roller 19 is less than the spacing between the race surface 17 and the race surface 27 on the ring member 21. The structure described above is disclosed more particularly in my Patent No. 2,430,359.

Figure 3:
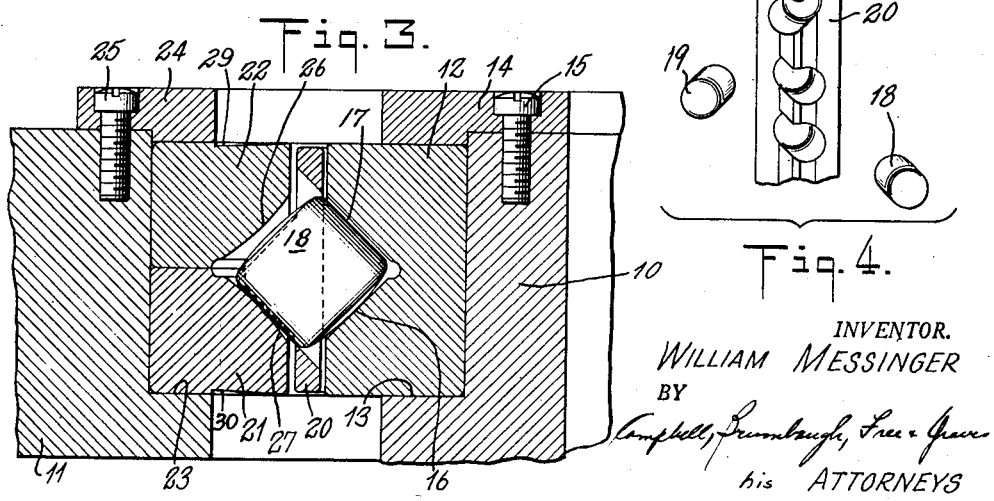
Fig. 3 is a view in section taken on line 3—3 of Fig. 1.
Figure 4:
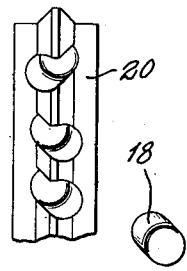
Fig. 4 is a view partially in section of the cage member of the bearing with some of the rollers removed therefrom.

The novelty of my improved X-type bearing resides in the following features. As shown in Figs. 2 and 3, each of the race surfaces 26 and 27 is slightly crowned so that when the race surfaces just engage the surfaces of the rollers, point contact is provided between about the centers of the cylindrical surfaces of the rollers and the crowned surfaces 26 and 27. The amount of crown of the roller is, in most instances, very small. For example, in a typical bearing, the crown on the race surface may be on the order of one thousandth of an inch. This crown is, however, sufficient to prevent the rollers from making contact only at their ends with the race surfaces 26 and 27 if the rollers cant slightly in the cage 20. In this way, any tendency of the rollers to bind or jam against the outer race surfaces 26 and 27 is prevented.

Another feature of my new bearing is the arrangement of the race rings 21 and 22 so that the bearing can be preloaded in order to eliminate play between the rollers and the race members. This effect is attained by milling or otherwise forming the rings 21 and 22 so that a space 28 is left between the rings 21 and 22 when these rings are in light engagement with the rollers 18 and 19. Also, the rings 21 and 22 are counterbored as at 29, and 30 in order to increase the transverse flexibility of these rings.

When the bearing is put into service, the clamping ring 24 is screwed down to force the adjacent faces of the rings 21 and 22 together thereby closing the gap or space 28 between the rings. As the rings move inwardly, they exert pressure against the sides of the rollers, thereby preloading them and eliminating all play between the rollers and the race surfaces. The space between the rings 21 and 22 may be varied substantially but a clearance in the vicinity of five or six thousandths of an inch has proved to be satisfactory to obtain adequate preloading of the bearings.

The pressure produced by forcing the rings 21 and 22 together produces some elastic indentation of the rollers and the race surfaces but not enough to impair seriously the action of the bearing. Some of the pressure results in flexing of the rings 21 and 22 for the reason that the counterbores 29 and 30 impart sufficient flexibility to the rings 21 and 22 to permit them to dish slightly as shown in Fig. 3. This dishing or deflection of the rings 21 and 22 stores resilient energy in time so that they act like springs maintaining an intimate contact between the rollers and the race surfaces even after the rollers and race surfaces have worn away to a substantial extent. While I have described the outer race ring as being split, it will be understood that the inner race ring can be split into two rings, instead. The outer race ring will, however, in either structure, be provided with the crowned race surfaces.

It will be understood that the above-described bearing is useful for many purposes where high precision of support of a rotary member is required and where chatter in a bearing would result in inaccurate operation of the machine in which the bearing is used. Therefore, my new bearing provides a very effective solution for the problem of producing a chatterless mount for a rotary element. It will be understood, of course, that the size of the bearing may be varied substantially depending upon requirements, that the amount of crown of the surface and the preloading of the bearing may also be modified in conformity with the conditions under which the bearing is to be used. Therefore, the form of the bearing disclosed herein should be considered as illustrative and not as limiting the scope of the following claims.

I claim:

1. An X type roller bearing comprising an inner race member having a pair of substantially right-angularly related conical race surfaces defining a groove in the member, a plurality of angularly related, cylindrical rollers in rolling engagement with each of the race surfaces, each roller having a diameter greater than the length of the roller, an outer race member having race surfaces thereon facing different race surfaces on the inner race member, the race surfaces on the outer race member engaging the rollers in rolling engagement with the facing race surfaces of the inner member, the race surfaces on the outer race member being crowned to make substantially point contact with the rollers in engagement therewith at about their mid-portions, one of the race members being divided circumferentially to provide two separable rings which are spaced apart a few thousandths of an inch when both rings are in light contact with the rollers, and means to force the rings substantially into engagement with each other to exert pressure on the rollers to preload the races and rollers and restrain the inner and outer race members against all relative movement except rotary movement, each roller having substantially line contact with its respective crowned race when the roller is canted slightly and the races and rollers are preloaded.

2. The bearing set forth in claim 1 in which the rings are sufficiently resilient to be deflected slightly by the pressure on the rollers thereby to exert resiliently applied pressure on the rollers.

WILLIAM MESSINGER.

REFERENCES CITED

The following references are of record in the file of this patent:

UNITED STATES PATENTS

| Number | Name | Date |
|---|---|---|
| 1,235,116 | Coppage | July 31, 1917 |
| 1,722,492 | Brunner | July 30, 1929 |
| 1,843,292 | Medved | Feb. 2, 1932 |
| 2,040,741 | Hoke | May 12, 1936 |
| 2,065,311 | Hoke | Dec. 22, 1936 |
| 2,071,628 | Hedgcock | Feb. 23, 1937 |
| 2,089,048 | Bachman | Aug. 2, 1937 |
| 2,430,359 | Messinger | Nov. 4, 1947 |